United States Patent [19]

Black et al.

[11] Patent Number: 4,670,165

[45] Date of Patent: Jun. 2, 1987

[54] METHOD OF RECOVERING HYDROCARBONS FROM SUBTERRANEAN FORMATIONS

[75] Inventors: Robert H. Black; John M. Wilson; James M. Brown, all of Duncan, Okla.

[73] Assignee: Halliburton Company, Duncan, Okla.

[21] Appl. No.: 797,564

[22] Filed: Nov. 13, 1985

[51] Int. Cl.$^4$ .................. E21B 43/22; E21B 43/26; E21B 43/27

[52] U.S. Cl. ......................... 252/8.551; 166/274; 166/307; 166/308; 252/8.553; 252/8.554; 502/160; 523/130; 526/93

[58] Field of Search ............... 252/8.55 R, 8.55 C, 252/8.55 D, 8.551, 8.553, 8.554; 502/160; 526/93; 523/130

[56] References Cited

U.S. PATENT DOCUMENTS

| | | |
|---|---|---|
| 2,801,984 | 8/1957 | Morgan et al. . |
| 2,834,760 | 5/1958 | Orr et al. ........................ 526/93 |
| 2,932,628 | 4/1960 | Uraneck et al. ................. 526/93 |
| 3,168,500 | 2/1965 | Suen et al. . |
| 3,334,689 | 8/1967 | McLaughlin . |
| 3,557,562 | 1/1971 | McLaughlin et al. . |
| 3,560,454 | 2/1971 | Buning et al. ................. 526/93 X |
| 4,070,865 | 1/1978 | McLaughlin . |
| 4,163,091 | 7/1979 | Pettelkau ..................... 502/160 X |
| 4,395,340 | 7/1983 | McLaughlin . |
| 4,401,789 | 8/1983 | Gideon . |
| 4,492,494 | 1/1985 | Szekely et al. . |

*Primary Examiner*—Herbert B. Guynn
*Attorney, Agent, or Firm*—Ed Sherer; Robert A. Kent

[57] ABSTRACT

A method of treating a subterranean formation comprising contacting the formation with an aqueous composition of desired viscosity. The aqueous composition is prepared by polymerizing water-soluble monomers in an aqueous solvent with a free radical initiator comprising a reduction-oxidation couple between cobaltous amine complex and an alkali metal or ammonium salt of peroxydisulfate.

20 Claims, 1 Drawing Figure

INDUCTION TIME (MIN.) VS TEMPERATURE (DEGREES F)

METHOD OF RECOVERING HYDROCARBONS FROM SUBTERRANEAN FORMATIONS

BACKGROUND OF THE INVENTION

A. Field of the Invention.

This invention relates to a method of producing high molecular weight polymers and the utilization of these polymers in the production of hydrocarbons from subterranean hydrocarbon-containing formations penetrated by one or more well bores.

B. Description of the Prior Art.

Viscous aqueous solutions containing organic polymers have been utilized heretofore for carrying out a variety of treatments in subterranean hydrocarbon-containing formations to increase the production of hydrocarbons therefrom. For example, in the production of hydrocarbons from oil and gas wells which also produce large volumes of salt water, the cost of producing the salt water, separating it from the produced hydrocarbons and disposing of the salt water represents an economic loss in the production of the wells. In order to reduce the production of salt water from such wells, viscous aqueous polymer solutions have been heretofore utilized to preferentially reduce water production from portions of the producing subterranean formations. The high molecular weight polymers or copolymers in the viscous aqueous solution plug the pores of the portions of the formation producing water and thereby substantially reduce the permeability of such portions to water whereby water production is also substantially reduced.

Viscous aqueous solutions containing organic polymers have been utilized in acidizing or fracturing of a hydrocarbon-containing subterranean formation. The usual acidizing operation comprises introducing a viscous aqueous solution containing a nonoxidizing acid into the formation under sufficient pressure to allow the acid to react with acid soluble components in the formation. Fracturing involves injecting the viscous aqueous solution into the formation at a pressure sufficient to create a crack or fracture in the formation.

Viscous aqueous polymer solutions have also been utilized heretofore in processes for enhanceing the recovery of oil from subterranean oil-containing formations. In such processes, the viscous aqueous polymer solution is injected into the formation by way of at least one injection well penetrating the formation and forced through the formation towards at least one production well penetrating the formation whereby the production of oil from the formation is increased. Such processes are usually carried out in subterranean oil-containing formations after primary recovery operations are completed, but they can also be utilized during and as a part of primary recovery operations. In the usual case, during primary recovery operations, the energy required to force oil into producing wells is supplied by the natural pressure drive existing in the formation or by mechanically lifting oil from the formation through the well bores of producing wells to the surface. At the end of primary recovery operations, a substantial quantity of oil often remains in the formation.

In enhanced recovery operations, energy for producing oil remaining in a subterranean oil-containing formation is supplied by injecting liquids or gases through one or more injection wells penetrating the formation into the formation under pressure whereby the liquids or gases drive the oil to producing wells penetrating the formation. The most common of such recovery techniques is known as water flooding wherein an aqueous liquid is injected into the formation under pressure which provides the energy and flushing action necessary to force oil in the formation to one or more production wells penetrating the formation. The efficiency of such water flooding techniques varies greatly depending upon a number of factors including variability in the permeability of the formation and the viscosity of the oil remaining in the formation. When the oil remaining in the formation is of a relatively high viscosity, an aqueous flooding medium of those viscosities such as fresh water or brine tends to finger through the high viscosity oil front and thereby bypass most of the available oil. In addition, typical subterranean formations contain layers of materials which often have widely varying permeabilities to oil flow. Consequentially, the aqueous flood medium tends to follow the course of least resistance, i.e., flow through zones of high permeability in the formation and thereby bypass zones of less permeability containing oil.

In order to overcome such problems, a flooding medium having viscosities in the order of or greater than the viscosity of oils to be displaced have been utilized. Generally, the viscosity of the water-flooding medium is increased to a level at which it is close to the viscosity of the oil to be displaced, preferably equal to or greater than the viscosity of the oil to be displaced. This causes the relative flow rates of the oil and the flooding medium in the formation to be comparable and the tendency of the flooding medium to finger through the oil front or bypass oil-containing portions of the formation is substantially diminished.

Solid water-soluble organic polymers have been commonly used heretofore for increasing the viscosity of aqueous well treating and injection solutions. Generally, the water-soluble organic polymers are dissolved in the aqueous treating or injection fluid at the site, either continuously or on a periodic basis. The dissolution of solid organic polymers in aqueous solutions is difficult, time-consuming and requires special mixing equipment. In addition, the use of solid organic polymers to increase the viscosity of aqueous treatment or injection solutions has been found to involve a number of problems. In the manufacture of high molecular weight linear polymers in solid form, the polymers are formed in a solvent, usually water, and the solvent is then removed. The removal of the solvent such as by evaporation often causes undesirable crosslinking of some of the polymers. The polymer crosslinking forms insoluble particles that swell when contacted with water to form gels, commonly called microgels. Because of the presence of such microgels in aqueous polymer wells treating and injection solutions used in well treatment and enhanced oil recovery processes, the solutions tend to plug the formation into which they are injected. The removal of the solvent also promotes hydrolysis which can lead to incompatibility of the polymer with brines.

Free radical polymerization of water-soluble vinyl monomers many times produces high molecular weight water-soluble polymers only under certain conditions. For instance, the initiator systems used for the polymerization generally require an elevated starting temperature and long induction times. Typical of these conditions are starting temperatures in excess of 80° F. and initiation periods of greater than 12 hours. Small changes in these reaction conditions can dramatically change the final molecular weight of the polymer. These requirements usually make the polymerization reaction unsuited for continuous polymerization processes.

Other problems are encountered in the polymerization of water-soluble vinyl monomers. For instance, if the polymerization process proceeds too rapidly, the polymers are produced at a low molecular weight which is unsuitable for oil field applications.

The present invention provides a method of producing a water-soluble polymer having a molecular weight in the range of from about 1,000 to about 10,000,000 using a free radical initiator system which is suitable for use in the recovery of hydrocarbons from subterranean hydrocarbon-containing formations penetrated by one or more well bores which overcomes or at least mitigates the above described problems.

SUMMARY OF THE INVENTION

By the present invention, methods of preparing viscous aqueous water-soluble polymer solutions for use in recovering hydrocarbons from a hydrocarbon-containing subterranean formation are provided whereby the water-soluble polymers formed have a molecular weight in the range of from about 1,000 to about 10,000,000. The method can be employed in a continuous polymerization process and thus the water-soluble polymers can be formed at the site of use of the solutions. The formation of the polymers in an aqueous solution at or near the location of their use avoids problems relating to the use of solid polymers, i.e., swelling of solid organic polymers upon contact with water and undesirable crosslinking of the solid polymers during the production thereof. In addition, the methods of the present invention whereby the polymers are prepared in solution at the job site avoid expenses associated with producing polymers in solid or liquid form and the time and expense involved in dissolving the polymers in an aqueous solution at the job site. Methods for recovering oil from subterranean oil-containing formations using such aqueous polymer solutions are also provided by the present invention.

DETAILED DESCRIPTION OF THE INVENTION

Figure 1:
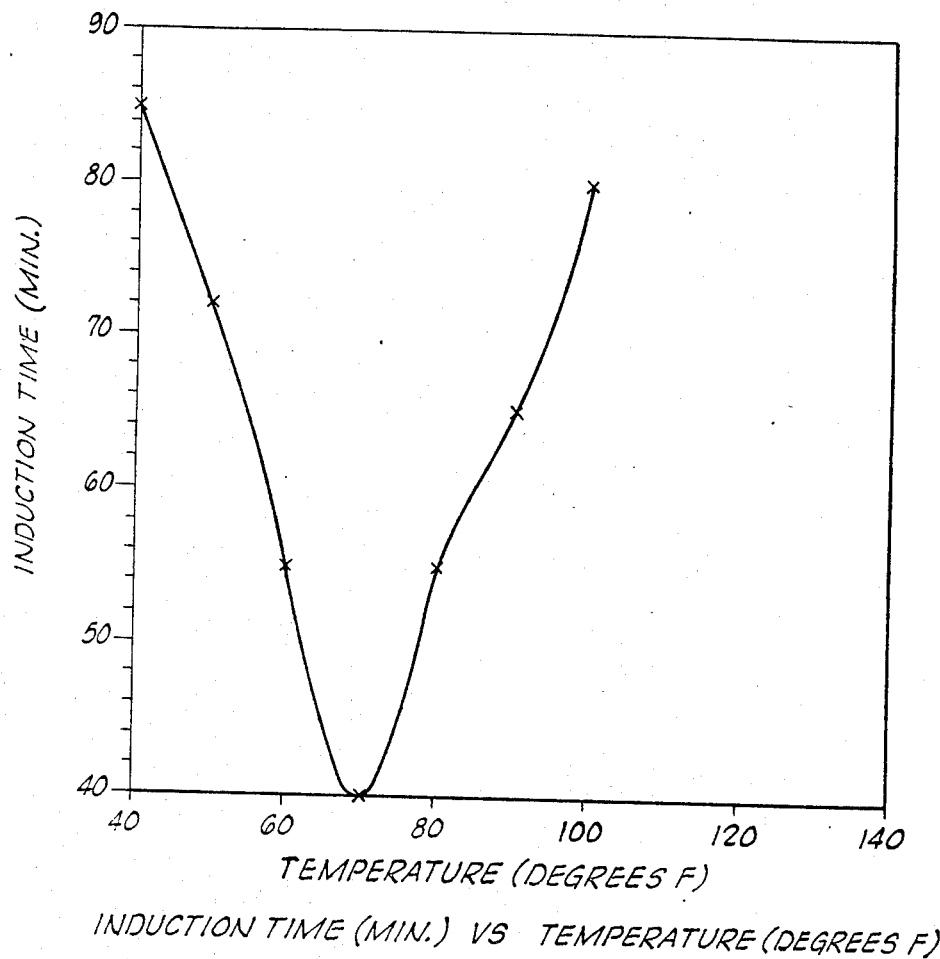
FIG. 1 illustrates the relationship between induction time and temperature in the preparation of the polymers.

In accordance with the methods of the present invention, a viscous aqueous organic polymer solution for treating a subterranean hydrocarbon-containing formation is prepared, which can be at the site where the solution is to be used, by polymerizing one or more water-soluble vinyl monomers in an aqueous polymer solvent solution. The resulting viscous polymer treating solution is utilized to treat a hydrocarbon-containing subterranean formation to enhance the recovery of hydrocarbons therefrom, e.g., the polymer solution is used for reducing water production from portions of the formation, for forming fractures therein, or for carrying out other procedures for stimulating the production of hydrocarbons from the formation. The viscous aqueous polymer solution produced is also particularly suitable for use in an enhanced oil recovery process wherein a viscous aqueous solution is injected into an oil-containing subterranean formation by way of at least one injection well penetrating the formation and forced through the formation towards at least one production well penetrating the formation.

In the method of the present invention for preparing the viscous aqueous organic polymer solution, one or more water-soluble polymerizable vinyl monomers or mixtures of such monomers represented by the formula:

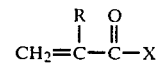

wherein:
R is selected from the group consisting of hydrogen and methyl;
X is selected from the group consisting of

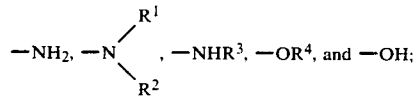

$R_1$, $R_2$, $R_3$ and $R_4$ are independently selected from the group consisting of an alkyl radical having from 1 to about 3 carbon atoms is combined with an aqueous solvent. The aqueous solvent preferably contains one or more metal salts of a strong inorganic acid at a high concentration e.g., at least 4 to about 12 percent by weight of the aqueous solvent. A water-soluble free radical initiator is then combined with the aqueous monomer solution whereby the rapid polymerization of the monomers takes place and a viscous aqueous polymer solution is formed.

As is well understood by those skilled in the art, the presence of dissolved oxygen in an aqueous medium in which vinyl monomers of the type described above are polymerized many time interferes with the polymerization so that long chain high molecular weight polymers are not formed. When an aqueous salt solution is utilized as the aqueous medium for the polymerization, because of the presence of the salt or salts in the solution, less dissolved oxygen is present therein. When a free radical initiator of the type used in the method is combined with the aqueous solution containing the vinyl monomers in accordance with the method of this invention, the combination of salt, free radical initiator and oxygen remaining in the solution causes the initiation of the polymerization reaction without the necessity of carrying out special procedures for the removal of oxygen from the solution. It is believed that the free radical initiator and salt function to reduce the dissolved oxygen content in the aqueous solution to a level whereby the polymerization reaction can proceed normally. Thus, the aqueous solvent utilized preferably contains one or more monovalent salts such as sodium chloride.

The free radical initiator utilized in the method of the invention can be described as a reduction-oxidation couple between a cobaltous amine complex and an alkali metal or ammonium salt of peroxydisulfate. The free radical initiator generally comprises a metal ion present in the range of from about 0.04 to about 12.0 percent by weight of the free radical initiator and comprising a cobalt ion having a valence of +2; an alkali metal or ammonium salt of peroxydisulfate present in the range of from about 12.0 to about 94.0 percent by weight of the free radical initiator and an amine compound present in the range of from about 4.0 to about 88.0 percent by weight of the aqueous composition and at least one member selected from the group consisting of tetraethylenepentamine, triethylenetetramine, aminoethyldiethylene triamine, aminoethyltriethylenetetramine and an amine compound represented by the formula:

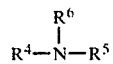

wherein:

$R_4$, $R_5$, $R_6$ are independently selected from the group consisting of hydrogen, an alkyl radical having 1 to about 6 carbon atoms, an alkyl amine radical having from about 1 to about 5 carbon atoms and containing a nitrogen atom, and an alkyl group having from about 1 to about 5 carbon atoms and containing a hydroxy group. Preferably the free radical initiator comprises a cobalt ion having a valence of $+2$, sodium peroxydisulfate, and tetraethylenepentamine.

Although the invention is not limited to any particular theory of operation, it is believed that cobaltous amine complex is formed between the cobalt ion having a valence of $+2$ and the amine compound and the cobalt ion of the amine complex is oxidized to a cobalt ion having a valence of $+3$ ion by the peroxydisulfate compound, such as sodium peroxydisulfate, thereby generating a sulfate free radical ion which, in the presence of reactive water-soluble vinyl monomers, will initiate a polymerization reaction in a short induction time over a wide range of temperatures and other conditions to produce polyacrylamide having a molecular weight from 1,000 to about 6,000,000. This reaction can be represented by the following reaction:

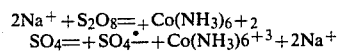

Examples of preferred vinyl monomers utilized in the method of the invention are acrylamide, N-methylacrylamide, N,N-dimethylacrylamide, N-ethylacrylamide, acrylic acid, sodium acrylate, potassium acrylate, lithium acrylate, methacrylic acid, sodium methacrylate, potassium methacrylate, and mixtures thereof. More preferrably, the vinyl monomers utilized are acrylamide and mixtures of acrylamide and acrylic acid.

Examples of preferred amine compounds include tetraethylenepentamine, triethylenetetramine, triethanolamine, diethanolamine, ethanolamine, aminoethyldiethylenetriamine, aminoethyltriethylenetetramine, and mixtures thereof. The most preferred amine compound is tetraethylenepentamine.

In carrying out the method of the invention, the monomers used are preferably combined with an aqueous solvent which may contain one or more salts. The salts contained in the aqueous solvent can be monovalent salts of strong inorganic acids such as sodium chloride, potassium chloride and sodium sulfate. Multivalent metal salts such as calcium chloride and magnesium carbonate can also be present, either alone or in combination with monovalent metal salts. The concentration of such salt or salts in the aqueous solution can be as high as saturation. Generally, the salts are present in the aqueous solvent in an amount in the range of from about 4 to about 12 percent by weight of the aqueous solvent.

The vinyl monomers utilized are preferably combined with the aqueous solvent followed by the free radical polymerization initiator which brings about the rapid polymerization of the monomers. The induction time, the time in which the polymerization reaction begins, varies according to the temperature of the aqueous solution as illustrated in FIG. 1.

The amount of free radical initiator employed to carry out the method of the invention is an amount sufficient to cause the vinyl monomers to polymerize. Generally, the amount of free radical initiator employed in the method of the invention is about 0.06 to about 2.0 weight percent based on the amount of monomer utilized. Preferably the amount utilized is about 0.2 to about 0.3 percent by weight of the monomer utilized.

The method of the invention is particularly advantageous in the preparation of viscous aqueous polymer solutions utilized in the treatment of subterranean hydrocarbon-containing formations to improve injection profiles and in carrying out enhanced oil recovery techniques in that the polymers produced in the solutions did not form microgels in the solutions and the polymer solutions have improved viscosity, i.e., the solution is formed in accordance with the methods and exhibits higher viscosities than solutions formed by dissolving solid or emulsion polymers in the aqueous medium or polymer solutions utilizing different free radical initiators. In addition, the polymers formed in accordance with the above described method may have a low degree of hydrolysis which results in an improved compatibility with divalent metal cations contained in formation waters and oil field brines as well as with additives commonly utilized in subterranean formation treating solutions such as polycationic organic polymer stabilizers, etc.

Hydrolysis is the conversion of amide groups in the polymers to carboxylate groups as represented by the equation:

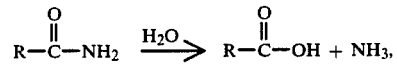

or the conversion of ester groups to carboxylate groups as represented by the equation:

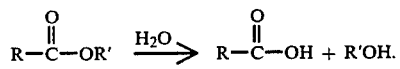

Hydrolysis of solid acrylamide polymers occurs during the drying and grinding operations. In addition, the conversion of amide groups to carboxylate groups occurs more rapidly in aqueous solutions of high pH and the conversion of ester groups takes place more rapidly in aqueous solutions which are strongly acidic or alkaline as compared to neutral aqueous solutions.

When the polymers used to form aqueous polymer solutions are hydrolyzed, the carboxyl groups ($CO_2H$ or $CO_2-$) in the polymers interact with divalent metal ions in the aqueous solution, or when the aqueous solution in which the polymers are dissolved does not contain divalent metal ions, the hydrolyzed polymers can interact with divalent metal ions contained in aqueous dilution solutions used or in formation brines contacted by the polymer solution. The interaction between hydrolyzed polymers and divalent metal ions forms poorly soluble species which often precipitate. The formation of solid particles in polymer solutions utilized to treat subterranean formations is extremely undesirable in that such solid particles can rapidly plug the pores of the formation whereby the injection of the solution into the formation is difficult or impossible and oil recovery from the formation is reduced. Once plugging of the formation pore spaces occures, remedial measures which must be taken to open up the pore spaces are expensive and time consuming. In some cases, the solid particles can be filtered out of a polymer solution before it is injected into a subterranean formation, but filtration of solids from viscous polymer solutions is difficult and time consuming. In addition, filtration of such solutions can cause degradation of the polymers and reduce the viscosity of the solution.

However, when the aqueous solutions used to form and dilute polymer solutions and when formation waters contacted by the polymer solutions are of low salinity, i.e., such aqueous solutions and waters contain less than about 1,000 ppm divalent metal ions, some polymer hydrolysis is desirable. In substantially fresh water, partially hydrolyzed polyacrylamide forms a more viscous solution than the same concentration of a non-hydrolyzed polyacrylamide of the same molecular weight. In addition, partially hydrolyzed polyacrylamide is not adsorbed on clays and sandstone as much as non-hydrolyzed polyacrylamide, and consequently, more polymer remains in solution in a formation containing clays and sandstone resulting in a more viscous solution and more oil recovery and/or less polymer being required.

By the methods of the present invention wherein the polymerization of monomers is carried out in an aqueous solution at or near the location of use of the resulting polymer solution, the degree of hydrolysis of the polymers formed is determined by the pH of the aqueous solution and/or other variables in accordance with the salinity of the aqueous solutions or brines utilized and/or to be contacted and other conditions relating to the particular application of the polymer solution whereby optimum results are achieved. Of particular advantage is the fact that the polymers can be formed with a low degree of hydrolysis whereby the precipitation of insoluble solids is substantially prevented and the polymers are not otherwise adversely affected by the presence of divalent or polyvalent metal cations in the solutions. Thus, oil field brines which are generally readily available in oil fields can be utilized as the solution in which the monomers are polymerized to form the viscous polymer solutions and as diluents for the solutions. Furthermore in offshore locations sea water can be utilized as the polymerization solvent and diluent. The term "oil field brine" is used herein to mean the saline water produced from subterranean formations containing metal salts and having high ionic strengths.

As understood by those skilled in the art, the quantity of monomers combined with a particular quantity of aqueous solvent determines the concentration of polymers in the solution and resultant viscosity thereof. Also, increasing the quantity of monomer with all other variables held constant brings about the production of polymers of higher average molecular weight. In the on-site preparation of viscous aqueous organic polymer solutions for treating subterranean hydrocarbon-containing formations, it is economically advantageous to prepare a concentrated polymer solution which is then diluted with additional brine or water to produce an aqueous polymer injection solution of desired viscosity. However, the concentration of the aqueous polymer solution is limited by the desired chain length of the polymers produced. For example, in subterranean formations of low permeability having relatively small pores, a smaller polymer chain length and molecular weight is generally required to achieve the desired result as compared to a highly permeable formation having large pores.

In carrying out the methods of the present invention, generally the monomers are combined with the aqueous solvent in an amount in the range of from about 1 percent to about 14 percent by weight of the resulting solution and more preferably, from about 6 to about 12 percent by weight of the resulting solution. The polymerization or free radical initiator is added to the aqueous solvent containing the monomers to initiate the polymerization action. The free radical initiator preferably comprises cobaltous nitrate hexahydrate present in an amount of about 3.2 percent by weight of the free radical initiator (based on the weight of the cobaltous ion), sodium peroxydisulfate present in an amount of about 80.7 percent by weight of the free radical initiator and tetraethylenepentamine present in an amount of about 16.1 percent by weight of free radical initiator. Preferably, the amount of free radical initiator utilized is about 0.28 percent by weight of monomer.

While the method of preparing the viscous aqueous polymer solutions described above can be carried out in aqueous solvent solutions of various pH levels, the rate of the polymerization reaction can be accelerated by controlling the pH of the solutions. The polymerization reaction utilizing the above described polymerization initiator proceeds at its most rapid rate at a solvent pH in the range of from about 3 to about 10.0. However, as described above, depending upon the desired degree of polymer hydrolysis and divalent metal ion concentration of the aqueous solvent and other solutions utilized, aqueous solutions of varying specific pH are utilized.

A particularly suitable buffer for stabilizing the pH during the polymerization reaction is a buffer selected from the group consisting of sodium and potassium tetraborate, sodium, potassium and lithium tetraborate pentahydrate, sodium, tetraborate decahydrate, dipotassium tetraborate tetahydrate, potassium pentaborate tetrahydrate disodium or dipotassium octaborate tetrahydrate, an aqueous solution of boric acid and sodium or potassium hydroxide and mixtures thereof. Of these, an aqueous solution of boric acid and sodium hydroxide is preferred.

In order to control the average molecular weight of the polymers produced, as well as the viscosity of the resulting solution, a chain transfer agent such as one selected from the group consisting of butyl alcohol, isopropyl alcohol and mixtures thereof can be combined with the aqueous solvent solution. The addition of such a chain transfer agent can increase the polymerization reaction rate and lowers the average molecular weight of the polymers produced as well as the viscosity of the resultant polymer solution. The average molecular weight of the polymers produced is also controlled by varying the quantity of polymerization initiator utilized. Generally, increases in the quantity of initiator utilized increases the reaction rate and lowers the polymer average molecular weight. Thus, by varying the quantities and types of initiator and chain transfer agent used, the average molecular weight of the polymers produced can be varied. As mentioned above, the particular average molecular weight desired depends on various factors such as the permeability of the formation to be treated, the viscosity of the oil to be recovered, etc.

Other additive such as biocides, surfactants and clay stabilizers can be combined with the aqueous polymer solution before or after the polymerization reaction is carried out therein.

Improved methods and systems for carrying out enhanced oil recovery techniques in subterranean oil-containing formations wherein viscous aqueous polymer solutions are prepared from monomer starting materials at the site using readily available fresh water, salt water, oil field brines or sea water disclosed in U.S. Pat. Nos. 4,395,340, 4,401,789 and 4,439,334 which are assigned to the assignee of the present invention and are hereby incorporated by reference. In accordance with such methods, a concentrated viscous aqueous polymer solution is prepared which can be diluted with additional fresh water, oil field brine or sea water to form a polymer solution of desired viscosity and other properties. The diluted polymer solution is injected into a subterranean formation by way of at least one injection well penetrating the formation whereby oil contained in the formation is driven towards at least one production well penetrating the formation.

In another embodiment of the invention, the viscous solution of the present invention is utilized in treating a subterranean formation to reduce the permeability of the subterranean formation to water thereby promoting better control of fluid injection patterns in the secondary or tertiary recovery of hydrocarbons and achieving water reduction in producing wells and thus reducing the quantity of water recovered from a subterranean formation penetrated by a well bore whereby the relative production rate of the hydrocarbons is increased.

In carrying out this embodiment of the invention, the viscous solution containing the water-soluble polymer is mixed preferably, with a crosslinking composition and the resulting mixture is injected into the subterranean formation. The mixture is directed to that portion of the subterranean formation where it is desired that the permeability be altered. After the injection of the above-described mixture, a spacer fluid is preferably injected into the well to displace the mixture from the tubing and out into the formation. Preferably the volume of the spacer fluid is the volume needed to displace all the treating fluids out in the formation plus five barrels per vertical foot of interval to be treated. The well is then preferably shut in for about 48 hours.

Another method of carrying out this embodiment of the invention the viscous aqueous polymer solution containing the water-soluble polymer is injected through a well into the subterranean formation whereby the polymer contacts that portion of the formation where the change in permeability is desired. Optionally, a spacer fluid such as a brine solution is next injected into the well and thus contacts the formation. After the spacer fluid injection is completed, a crosslinking compound is injected into the well bore and into the formation whereby the crosslinking composition contacts the polymer in the formation. Finally, a second viscous aqueous solution containing the water-soluble polymer is injected into the well and into the formation. The steps of injecting the crosslinking composition and the second organic polymer can be repeated if necessary. This embodiment is used primarily for treating waterflood injection wells.

Spacer fluids that can be used in the present invention are well known in the art and include brine solutions, alkali metal halide solutions and the like.

Crosslinking agents suitable for carrying out this embodiment of the invention are well known in the art. Examples of such crosslinking agents include, for example, crosslinking solutions having 25 ppm to about 10,000 ppm of a multivalent metal cation such as $Fe^{2+}$, $Fe^{3+}$, $Al^{3+}$, $Ti^{4+}$, $Zn^{2+}$, $Sn^{4+}$, $Zr_{4+}$, $Ca^{2+}$, $Mg^{2+}$, $Cr_{3+}$ complexed with from about 25 ppm to about 100,000 ppm of retarding anions such as acetate, nitrilotriacetate, tartrate, citrate, phosphate, and lactate. A preferred crosslinking composition which is disclosed in U.S. Pat. No. 4,524,829 and is hereby incorporated by reference comprises zirconium oxychloride present in an amount sufficient to produce one mole of zirconium metal ion having a valence of +4, about 2 moles of lactic acid, and about 2 moles of triethanolamine.

The polymer used in this embodiment of the invention generally has a molecular weight of at least 100,000 and contains carboxyl functionality.

In another embodiment of the invention, the viscous solution containing the water-soluble polymers and a propping agent is pumped into a subterranean formation at sufficient pressure to initiate a fracture in the formation.

Conventional propping agents can be employed in this embodiment of the invention. Examples of suitable propping agents include quartz sand grains, tempered glass beads, walnut shells, resin coated sand, sintered bauxite, and other similar materials. Propping agents generally are used in concentrations in the range of from about 1 to about 10 pounds per gallon of aqueous fluid; however, higher or lower concentrations may be used as required. The particle size of the propping agent employed is a function of the nature of the formation to be fractured, the pressure required to produce the fracture, the pumping fluid flow rates available, as well as other known factors. However, particle sizes in the range of from about 200 to about 2 mesh in the U.S. Sieve Series scale may be employed in carrying out the present invention.

In another embodiment of the present invention, the viscous aqueous solution containing the water soluble polymers and an acid is introduced into a subterranean formation whereby the calcareous rock in the formation is dissolved thereby increasing the permeability and permitting better flow of fluids through the formation. The pumping rate and pressures utilized will depend on the characteristics of the formation and weather fracturing of the formation. After the viscous solution has been injected in this manner, the well will normally be shut in and allowed to stand for a period of time ranging from one hour to several hours or, possibly, a day or more. If there is pressure on the well, the pressure is then released and the spent acid-containing viscous solution is permitted to flow back into the well bore and pumped to the surface.

Examples of suitable acids are known to those skilled in the art and include inorganic acids such as hydrochloric acid and hydrofluoric acid and organic acids such as acetic acid.

The following examples will serve to more comprehensively illustrate the principles of the invention, but are not intended to limit the bounds of the invention.

EXAMPLE I

A series of tests were conducted utilizing aqueous solutions containing acrylamide monomer and a free radical initiator comprising cobaltous ion (as cobaltous nitrate hexahydrate), sodium peroxydisulfate (SP) and a mixture of amines which is commercially available from Union Carbide. The mixture contained the following amines: 0.42 percent by weight aminoethyldiethylenetriamine; 11.21 percent by weight triethylenetetramine; 1.97 percent by weight Bis-(2-aminoethyl) piperazine; 6.10 percent by weight piperazinoethylethylenediamine; 13.39 percent by weight aminoethyltriethylenetetramine; 1.14 percent by weight bis-piperazine, 19.53 percent by weight aminoethylpiperazinoethylethylene diamine, 4.75 percent by weight piperazionethyldiethylenetriamine, and 33.74 percent by weight tetraethylenepentamine (the mixture is hereinafter referred to as "TEPA").

Each test utilized a 300 ml solution which comprised water, 60 ml of liquid acrylamide (45% by weight activity), and a free radical initiator containing varying amounts, measured in millimeters, of 10 percent by weight TEPA, 1 percent by weight cobaltous ion (cobalt nitrate hexahydrate was the source of the cobaltous ion), and 10 percent by weight sodium peroxydisulfate (SP).

The solutions were placed on a Brookfield Recording Viscometer with a #1 spindle. 20 ml of mineral oil was poured on top of the solutions to minimize oxygen contamination from the air. The induction time was measured as the time from addition of the persulfate to the development of 100 cps viscosity as determined from the output of the recording viscometer. After 4 hours from the addition of the initiator and monomer, the solution was diluted so that it contained 1000 ppm or the polymer. The results of these tests are shown in Table I.

TABLE I

Polymerization Of Acrylamide Monomers With Free Radical Initiator

| Test No. | TEPA (ml) | Cobalt (ml) | SP (ml) | Induction Time (min) | Viscosity @ 4 hr 1000 ppm |
|---|---|---|---|---|---|
| 1. | 1.8 | 0.0 | 1.2 | 175 | 1.78 cps |
| 2. | 1.8 | 1.8 | 1.2 | 5 | 1.73 cps |
| 3. | 0.9 | 1.8 | 1.2 | 7 | 1.74 cps |
| 4. | 0.9 | 0.9 | 1.2 | 70 | 1.91 cps |
| 5. | 0.45 | 0.9 | 1.2 | 75 | 2.20 cps |
| 6. | 0.225 | 0.9 | 1.2 | 50 | 2.56 cps |
| 7. | 0.10 | 0.9 | 1.2 | 50 | 2.65 cps |
| 8. | 0.05 | 0.9 | 1.2 | 260 | — |
| 9. | 0.025 | 0.9 | 1.2 | 300 | — |
| 10. | 0.0 | 0.9 | 1.2 | 300 | — |
| 11. | 0.18 | 0.9 | 1.2 | 50 | 2.62 cps |
| 12. | 0.18 | 0.9 | 0.6 | 120 | 2.81 cps |
| 13. | 0.18 | 0.9 | 0.3 | 300 | — |
| 14. | 0.12 | 0.9 | 0.6 | 50 | 2.94 cps |
| 15. | 0.12 | 1.2 | 0.6 | 50 | 2.62 cps |
| 16. | 0.18 | 0.6 | 0.6 | 190 | — |
| 17. | 0.12 | 0.6 | 0.6 | 135 | 3.06 cps |

EXAMPLE II

A series of tests was performed in the same manner as described in EXAMPLE I except that the acrylamide concentration was 8 percent by weight of the solution, the TEPA was 1 percent by weight, and the makeup water was synthetic brine. The synthetic brine has the following analysis:

| Bicarbonate | 320 ppm |
|---|---|
| Chloride | 47700 ppm |
| Sulfate | 1500 ppm |
| Strontium | 60 ppm |
| Barium | 4 ppm |
| Calcium | 3390 ppm |

-continued

| Magnesium | 722 ppm |
|---|---|
| Sodium | 26400 ppm |
| Total Dissolved Solids | 80100 ppm |

At 4 hours after the initator was added to the solution, a 1000 ppm dilution was made by diluting one gram of the concentrate to 80 grams total with the synthetic brine. The viscosity was measured with a Brookfield Viscometer with a UL adapter, 6 r.p.m. at 72° F. and 150° F. The results of these tests are shown in Table II.

TABLE II

| Test No. | TEPA (ml) | Cobalt (ml) | SP (ml) | Induction Time (min) | Viscosity @ 4 hr 1000 ppm 72° F. | Viscosity @ 4 hr 500 ppm 150° F. |
|---|---|---|---|---|---|---|
| 1. | 1.2 | 0.9 | 0.6 | 20 | 3.7 cps | 1.35 cps |
| 2. | 1.2 | 0.6 | 0.6 | 40 | 4.6 cps | 1.70 cps |
| 3. | 0.6 | 0.6 | 0.6 | 100 | 6.9 cps | 1.90 cps |

EXAMPLE III

A series of tests was conducted to determine the effect of aging on an admixture containing TEPA and cobalt nitrate hexahydrate. After the admixture aged to a specified period of time, the admixture was added a solution containing 60 ml of 45 percent by weight acrylamide. An amount of 0.6 ml of 10 percent by weight SP was added to the solution. Viscosity and induction time were then measured. The results of these tests are shown in Table III.

TABLE III

| Admixture: | 1.2 ml 1% TEPA |
| | 0.6 ml 1% Cobalt nitrate hexahydrate |
| | 28.2 ml Water |

| Test No. | Age Time (days) | Induction Time (min) | Viscosity @ 4 hrs 1000 ppm |
|---|---|---|---|
| 1. | 0 | 40 | 6.00 cps |
| 2. | 3 | 45 | 5.97 cps |
| 3. | 8 | 60 | 5.95 cps |
| 4 | 14 | 195 | 5.30 cps |
| 5. | 18 | no polymerization | — |

It was believed no polymerization occurred after 18 days because the cobalt had oxidized and would not react with the SP.

EXAMPLE IV

A series of tests were conducted to determine the effect of monomer concentration on solution viscosity. The tests were carried out in the same manner as EXAMPLE I. The 300 ml solution comprised 210.0 ml of the synthetic brine described in EXAMPLE II, 30.6 ml of the free radical initiator which comprised 1.2 ml of 1 percent by weight TEPA, 0.6 ml of 1 percent by weight cobalt nitrate hexahydrate, 28.2 ml of water, 0.6 of 10 percent by weight SP, and liquid acrylamide which contained 45 percent by weight acrylamide. The results of these tests are shown in Table IV.

TABLE IV

| Test No. | Monomer Conc. (weight %) | Induction Time (min) | Viscosity @ 4 hrs 1000 ppm 72° F. | Viscosity @ 4 hrs 500 ppm 150° F. |
|---|---|---|---|---|
| 1. | 9% | 30 | 4.09 cps | 1.32 cps |
| 2. | 8% | 35 | 4.03 cps | 1.33 cps |
| 3. | 7.5% | 40 | 3.44 cps | 1.23 cps |

TABLE IV-continued

| Test No. | Monomer Conc. (weight %) | Induction Time (min) | Viscosity @ 4 hrs 1000 ppm 72° F. | Viscosity @ 4 hrs 500 ppm 150° F. |
|---|---|---|---|---|
| 4. | 6% | 50 | 2.90 cps | 1.19 cps |
| 5. | 4% | 75 | 2.51 cps | 1.02 cps |

EXAMPLE V

A series of tests was carried out to determine the effect of temperature on induction time utilizing the free radical initiator described in EXAMPLE IV. The procedure utilized in the tests was the same procedure as set forth in EXAMPLE IV. The concentration of the acrylamide was 9 percent by weight of solution. The results of these tests are illustrated in FIG. 1.

This invention is not limited to the above-described specific embodiments thereof; it must be understood, therefore, that the detail involved in the descriptions of the specific embodiments is presented for the purpose of illustration only, and reasonable variations and modifications, which will be apparent to those skilled in the art, can be made in this invention without departing from the spirit and scope thereof.

What is claimed is:

1. A method of treating a subterranean formation comprising:
   (a) preparing an aqueous solution of desired viscosity by polymerizing an aqueous composition containing a free radical initiator and a water-soluble vinyl monomer or a mixture of such monomers of the formula:

$$CH_2=\overset{R}{\underset{|}{C}}-\overset{O}{\underset{||}{C}}-X$$

wherein:
R is selected from the group consisting of hydrogen and methyl;
X is selected from the group consisting of

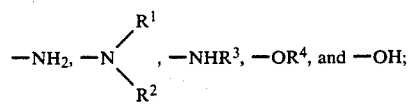

and
$R^1$, $R^2$, $R^3$ and $R^4$ are independently selected from the group consisting of an alkyl radical having in the range of from 1 to about 3 carbon atoms;
wherein said free radical initiator comprises
(i) a metal ion present in the range of from about 0.04 to about 12.00 percent by weight of the initator and comprising a cobalt ion having a valence of +2;
(ii) an alkali metal or ammonium salt of peroxydisulfate present in the range of from about 12.0 to about 94.0 percent by weight of the initiator; and
(iii) an amine compound present in the range of from about 4.0 to about 88.0 percent by weight of the initiator and comprising at least one member selected from the group consisting of tetraethylenepentamine, triethylenetetramine, aminoethyldiethylenetriamine, aminoethyltriethylenetetramine and an amine represented by the formula:

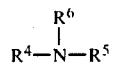

wherein:
$R^4$, $R^5$, $R^6$ are independently selected from the group consisting of hydrogen, an alkyl radical having 1 to about 6 carbon atoms, an alkyl amine radical having from about 1 to about 5 carbon atoms and containing a nitrogen atom, and an alkyl group having from about 1 to about 5 carbon atoms and containing a hydroxy group;
wherein said monomer is present in said aqueous composition in an amount in the range of from about 1 to about 14 percent by weight of the composition; and
   (b) contacting said formation with said solution.

2. The method recited in claim 1 wherein said amine compound is selected from the group consisting of tetraethylenepentamine, triethylenetetramine, triethanolamine, diethanolamine, ethanalomine, aminoethyldiethylenetriamine, aminoethyltriethylenetetramine, and mixtures thereof.

3. The method recited in claim 2 wherein the water-soluble vinyl monomer is selected from the group consisting of acrylamide, N-methacrylamide, N-ethylacrylamide, acrylic acid, sodium acrylate, potassium acrylate, lithium acrylate, methacrylic acid, sodium methacrylate, potassium methacrylate, and mixtures thereof.

4. The method recited in claim 3 wherein said cobalt ion is present in an amount of about 3.2 percent by weight of the initiator and is derived from cobaltous nitrate hexahydrate.

5. The composition recited in claim 4 wherein said amine compound is tetraethylenepentamine and is present in an amount of about 16.1 percent by weight of the initiator.

6. The method recited in claim 5 wherein said peroxydisulfate is sodium peroxydisulfate.

7. The method recited in claim 6 wherein the aqueous composition contacts the formation at a pressure sufficient to fracture the formation.

8. The method recited in claim 6 wherein an acid is combined with the composition of step (b).

9. The method recited in claim 8 wherein the said water-soluble vinyl monomer is acrylamide and is present in the range of from about 6 to about 12 percent by weight of the aqueous composition.

10. The method recited in claim 9 wherein crosslinking composition is combined with the composition of step (b).

11. The method recited in claim 10 wherein said aqueous composition is substantially oxygen free.

12. A method of enhancing the recovery of oil from a subterranean oil-containing formation wherein a viscous aqueous solution containing one or more water-soluble polymers is injected into the formation by way of at least one injection well penetrating the formation and forced through the formation towards at least one production well penetrating the formation comprising:
   (a) preparing a viscous aqueous polymer solution of desired viscosity at the site of said injection and production wells by combining one or more water-soluble vinyl monomers with an aqueous solvent to form an admixture, said vinyl monomers being selected from the group consisting of monomers or mixtures of such monomers of the formula:

$$CH_2=\overset{R}{\underset{|}{C}}-\overset{O}{\underset{\|}{C}}-X$$

wherein:
R is selected from the group consisting of hydrogen and methyl;
X is selected from the group consisting of $$-NH_2, -N\overset{R^1}{\underset{R^2}{\diagdown}}, -NHR^3, -OR^4, \text{ and } -OH;$$

and
$R^1$, $R^2$, $R^3$, and $R^4$ are independently selected from the group consisting of an alkyl radical having in the range of from 1 to about 3 carbon atoms;
(b) combining a free radical initiator with the admixture (a) to cause polymerization of the monomers; said free radicals initiator comprising:
(i) a metal ion present in the range of from about 0.04 to about 12.00 percent by weight of the initiator and comprising a cobalt ion haing a valence of +2;
(ii) an alkali metal or ammonium salt of peroxydisulfate present in the range of from about 12.0 to about 94.0 percent by weight of the initiator; and
(iii) an amine compound present in the range of from about 4.0 to about 88.0 percent by weight of the initiator and comprising at least one member selected from the group consisting of tetraethylenepentamine, triethylenetetramine and an aminoethyldiethylenetriamine, aminoethyltriethylenetetramine amine represented by the formula:

$$R^4-\overset{R^6}{\underset{|}{N}}-R^5$$

wherein:
$R^4$, $R^5$, $R^6$ are independently selected from the group consisting of hydrogen, an alkyl radical having 1 to about 6 carbon atoms, an alkyl amine radical having from about 1 to about 5 carbon atoms and containing a nitrogen atom, and an alkyl group having from about 1 to about 5 carbon atoms and containing a hydroxy group;
wherein said monomer is present in said aqueous composition in an amount in the range of from about 1 to about 14 percent by weight of the composition;
(c) diluting said admixture containing polymerized material with additional amount of aqueous solvent to thereby form an aqueous injection fluid; and
(d) injecting said aqueous injection fluid into said formation by way of said injection well.

13. The method recited in claim 12 wherein said aqueous solvent is substantially oxygen free.

14. The method recited in claim 13 wherein said amine compound is selected from the group consisting of tetraethylenepentamine, triethylenetetramine, triethanolamine, diethanolamine, ethanolamine, aminoethyldiethylenetriamine, aminoethyltriethylenetetramine, and mixtures thereof.

15. The method recited in claim 14 wherein the water-soluble vinyl monomer is selected from the group consisting of acrylamide, N-methacrylamide, N-ethylacrylamide, acrylic acid, sodium acrylate, potassium acrylate, lithium acrylate, methacrylic acid, sodium methacrylate, potassium methacrylate and mixtures thereof.

16. The method recited in claim 15 wherein said cobalt ion is present in an amount of about 3.2 percent by weight of the initiator and is derived from cobaltous nitrate hexahydrate.

17. The composition recited in claim 16 wherein said amine compound is tetraethylenepentamine and is present in an amount of about 16.1 percent by weight of the initiator.

18. The method recited in claim 17 wherein said peroxydisulfate is sodium peroxydisulfate.

19. The method recited in claim 18 wherein the aqueous composition contacts the formation at a pressure sufficient to fracture the formation.

20. The method recited in claim 18 further characterized to include the step of combining a chain transfer agent with said solution prior to polymerizing said vinyl monomer therein.

* * * * *

UNITED STATES PATENT AND TRADEMARK OFFICE
CERTIFICATE OF CORRECTION

PATENT NO : 4,670,165
DATED : June 2, 1987
INVENTOR(S) : Robert Black, Mike Wilson and Mike Brown It is certified that error appears in the above-identified patent and that said Letters Patent is hereby corrected as shown below:

In column 4, line 25, the phrase "$R_1$, $R^2$, $R^3$ and $R^4$" should read -- $R^1$, $R^2$, $R^3$ and $R^4$ --..

In column 5, line 14, the phrase "$R_4$, $R_5$, $R_6$" should read -- $R^4$, $R^5$, $R^6$ --.

In column 10, lines 6 and 7, the phrase "$Fe^{3+}$, $Al^{3+}$, $Ti^{4+}$, $Zn^{2+}$, $Sn^{4+}$, $Zr_{4+}$, $Ca^{2+}$, $Mg^{2+}$, $Cr_{3+}$" should read --$Fe^{3+}$, $Al^{3+}$, $Ti^{4+}$, $Zn^{2+}$, $Sn^{4+}$, $Zr^{4+}$, $Ca^{2+}$, $Mg^{2+}$, $Cr^{3+}$ --.

In column 11, line 31, following the phrase "contained 1000 ppm", the word "or" should read -- of --.

In column 15, line 27, following the words "cobalt ion", the word "haing" should read --having--.

In column 15, line 35, following triethylenetetramine, the words "and an" should be deleted and in column 15, line 37, before the word "amine" insert the words -- and an --.

Signed and Sealed this

Third Day of November, 1987

*Attest:*

DONALD J. QUIGG

*Attesting Officer*

Commissioner of Patents and Trademarks